United States Patent [19]

Yamanaka

[11] 3,950,011

[45] Apr. 13, 1976

[54] TRAILER TRUCK

[75] Inventor: Akira Yamanaka, Yokohama, Japan

[73] Assignee: Mitsubishi Jidosha Kogyo Kabushiki Kaisha, Tokyo, Japan

[22] Filed: Oct. 11, 1974

[21] Appl. No.: 514,016

[52] U.S. Cl.......... 280/432; 280/423 R; 280/438 R; 280/446 B; 280/441; 296/35 B; 188/1 C
[51] Int. Cl.² .......................................... B62D 3/10
[58] Field of Search.... 280/423, 432, 438 R, 446 B, 280/441; 296/35 B; 188/1 C

[56] References Cited
UNITED STATES PATENTS

| 1,951,258 | 3/1934 | Retzlaff et al. | 280/441 |
| 2,550,632 | 4/1951 | Young et al. | 280/432 |
| 2,933,331 | 4/1960 | Stamm | 280/438 R |
| 3,203,712 | 8/1965 | Lorrin | 280/438 R |
| 3,519,301 | 7/1970 | Somnitz | 188/1 C X |
| 3,740,076 | 6/1973 | Cupp | 280/432 |
| 3,757,900 | 9/1973 | Gischlar | 188/1 C |
| 3,853,298 | 12/1974 | Libkie | 188/1 C X |

FOREIGN PATENTS OR APPLICATIONS

| 1,209,886 | 1/1966 | Germany | 280/441 |

Primary Examiner—M. H. Wood, Jr.
Assistant Examiner—R. Schrecengost
Attorney, Agent, or Firm—Oldham & Oldham Co.

[57] ABSTRACT

A trailer truck comprising a trailer mounted at its front on the rear of a chassis frame of a tractor and energy absorbing system located between the chassis frame and a coupler of the trailer and adapted to allow an upward or forward movement of the coupler relative to the frame to absorb kinetic energy of the trailer upon collision.

15 Claims, 22 Drawing Figures

TRAILER TRUCK

BACKGROUND OF THE INVENTION

This invention relates to a trailer truck in which an impact force potentially affecting the crew in a tractor upon collision is absorbed.

Due to heavy gross vehicle weight of trailer trucks, conventional energy absorbing systems for protecting the crew in the trucks upon collision must have larger size than that used for motor cars to absorb sufficiently impacting energy. In the conventional energy absorbing system, acceleration of gravity applied to the crew upon collision becomes so great as to cause crew injury because of the great additional force resulting from the trailer and the load thereon, though the chassis frame of the tractor is capable of absorbing the kinetic energy by plastic deformation of the chassis frame.

SUMMARY OF THE INVENTION

To avoid the above drawbacks, this invention provides a trailer truck comprising a trailer mounted at its front on the rear of a chassis frame of a tractor to be allowed to move forwardly or upwardly relative to said chassis frame upon application of a longitudinal impact force greater than a predetermined value to said trailer, and an energy absorbing system located between said chassis frame of the tractor and said front of the trailer for absorbing the kinetic energy of said trailer upon relative movement thereof.

When a vehicle collides against the trailer of the trailer truck made according to the invention and the impact force acting onto the trailer exceeds a predetermined value, the trailer is moved forwardly relative to the tractor, but the kinetic energy of this moved trailer is absorbed by means of said energy absorbing system so that the impact force acting onto the trailer, which force exceeds the predetermined value, will not be directly transmitted to the tractor, thereby relieving the impact force that would affect the crew therein.

DETAILED DESCRIPTION

Figure 1:
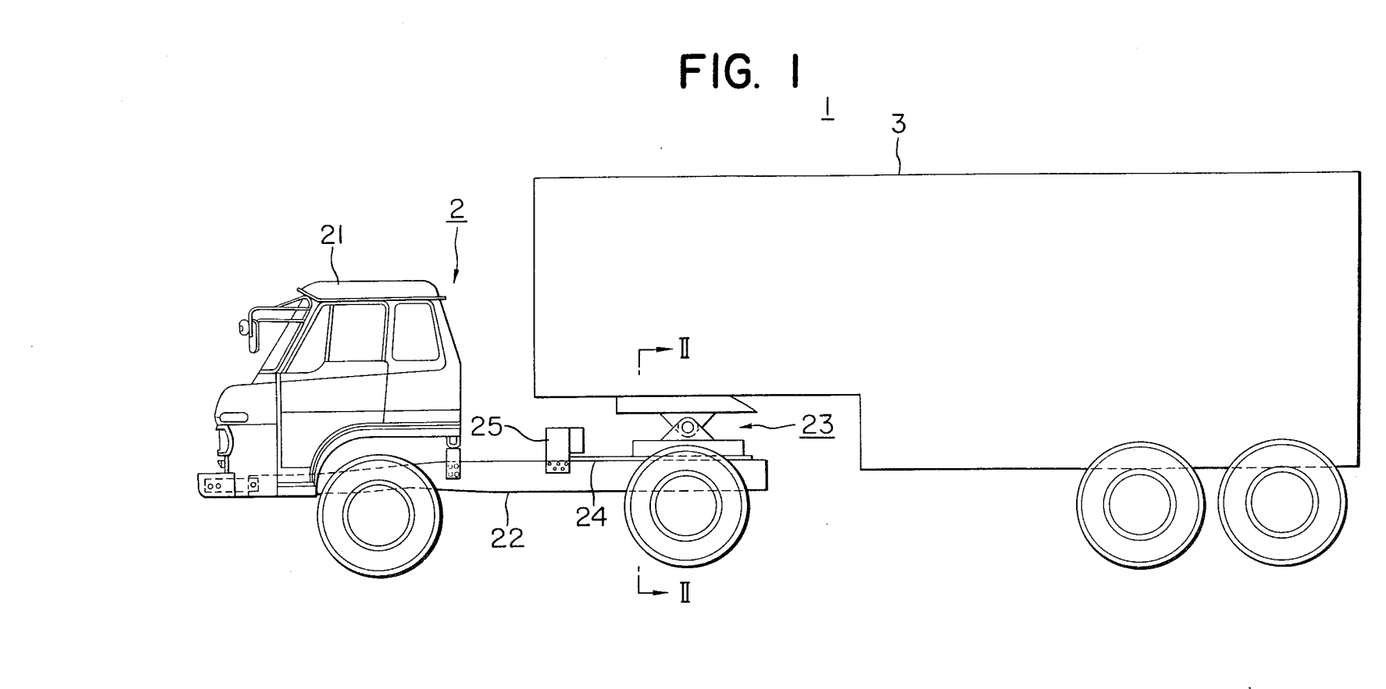
FIG. 1 shows a side view of a first embodiment of a trailer truck according to the invention.
Figure 2:
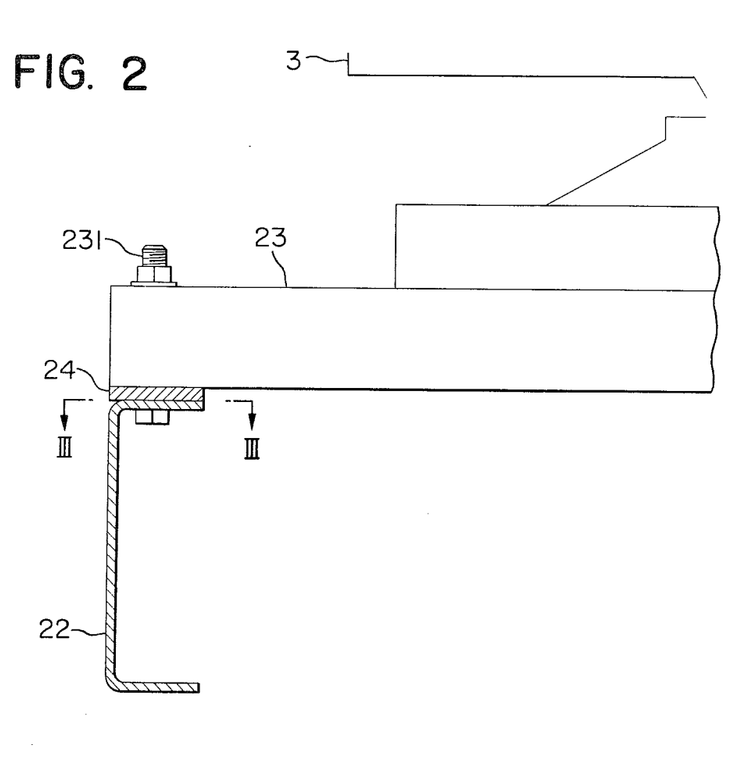
FIG. 2 shows a cross-sectional view of an energy absorbing means of the trailer truck, taking along the line II—II in FIG. 1.
Figure 3:
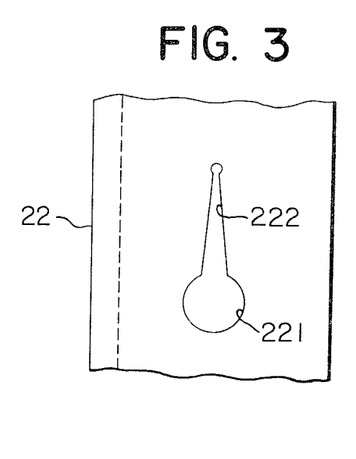
FIG. 3 shows a cross-sectional view taking along the line III—III in FIG. 2.

In the first embodiment shown in FIGS. 1 to 3, a semitrailer truck 1 consists of a tractor 2 and a semitrailer 3. The tractor 2 has a cab 21, a chassis frame 22, a coupler 23 and a friction plate 24. The cab 21 is mounted on the frame 22. The coupler 23 is mounted by means of bolts 231 on the friction plate 24 fixed to the frame 22. The bolt 231 is inserted through a bore 221 provided in an upper flange of the frame 22 and having a groove 222 extending forwardly in relation to the frame. Therefore, when an impact force exceeding a predetermined value acts onto the coupler 23 upon collision of the trailer truck, the bolt 231 moves with the coupler 23 forwardly in relation to the frame to spread out the groove 222 to plastically deform the frame 22. A king-pin, not shown, of the semitrailer is inserted into the coupler 23 to connect the tructor 2 and the semitrailer 3. A stopper 25 is provided on the frame 22 in front of the coupler 23 for limiting forward movement of the coupler 23 upon collision of the truck.

When a vehicle collides against the rear of the semitrailer 3, the latter transmits an impact force generated by the collision of the vehicle to the coupler 23 through the king-pin. By this impact force the coupler 23 is moved forwardly of the truck on the friction plate 24 to allow the bolts 231 to plastically deform the grooves 222. Thus, kinetic energy applied to the semitrailer 3 which occupies more than two third of the gross vehicle weight of the truck 1 is absorbed through the friction between the coupler 23 and the friction plate 24 and through the plastic deformation of the grooves 222 of the frame 22 by the bolts 231, so that said impact force will not be directly transmitted to the tractor 2. Therefore, the impact force affecting the crew in the tractor 2 is relieved to prevent injury to the crew. Also, it is possible to compact an energy buffering device such as bumper, not shown, provided on the front of the tractor 2.

In the aforesaid embodiment, there is described the case when a vehicle collides against the rear of the semitrailer truck 1, but the same effect is obtained in the case when the semitrailer truck collides against obstacles in front of it.

Materials for the friction plate 24 may be brake pad materials, metals having large coefficient of friction, woods, plastics, etc.

Figure 4:
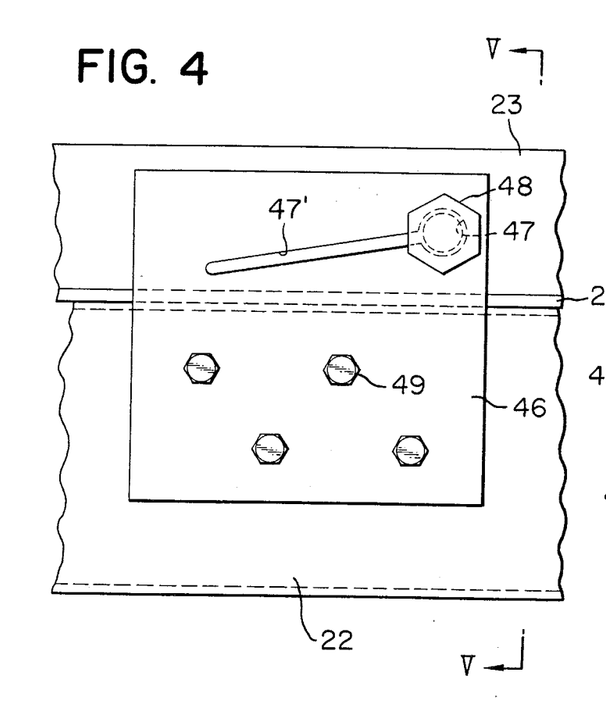
FIG. 4 shows a modified view of the energy absorbing means in FIG. 2.
Figure 5:
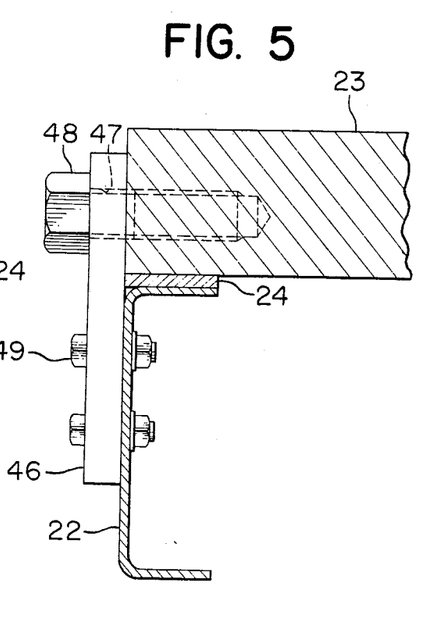
FIG. 5 shows a cross-sectional view taking along the line V—V in FIG. 4.

Instead of using the bolts 231, it is possible to fix the chassis frame 22 with the coupler 23 by means of a friction reinforcing fixing plate 46 of a rectangular metal plate which is secured to the coupler 23 and the chassis frame 22 by bolts, as shown in FIGS 4 and 5. The friction reinforcing fixing plate 46 is formed with a bore 47 at its right hand end of a portion contacting with the coupler 23 and with a slot 47' inclined leftwardly and downwardly from the bore 47. A bolt 48 is inserted through the bore 47 into a threaded bore in the coupler 23 to connect the coupler 23 with the fixing plate 46 which is also secured to the frame 22 by means of bolts 49. Therefore, when the semitrailer 3 receives the forward impact force more than a predetermined value, it is moved forwardly with effect of resistances of said friction plate 24 and the friction reinforcing fixing plate 46. Upon movement of the semitrailer 3 the bolt 48 integrated with the semitrailer moves to the left in FIG. 4 to spread the slot 47' in the fixing plate 46 from the bore 47 thereof, so that the coupler 23 depresses more strongly the friction plate 24 located between the coupler 23 and the frame 22 to increase the friction force of the plate 24, thereby absorbing sufficiently the kinetic energy of the semitrailer 3.

Figure 6:
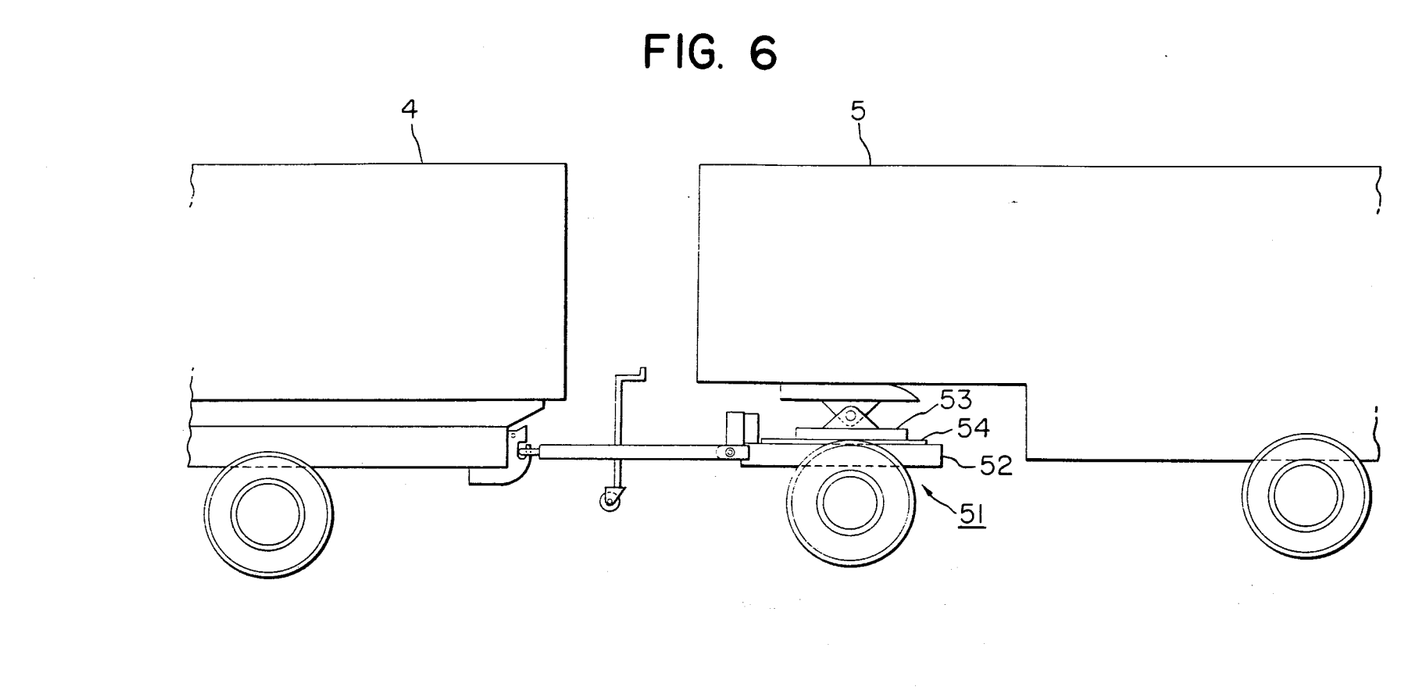
FIG. 6 shows a side view of a second embodiment of the trailer truck.
Figure 7:
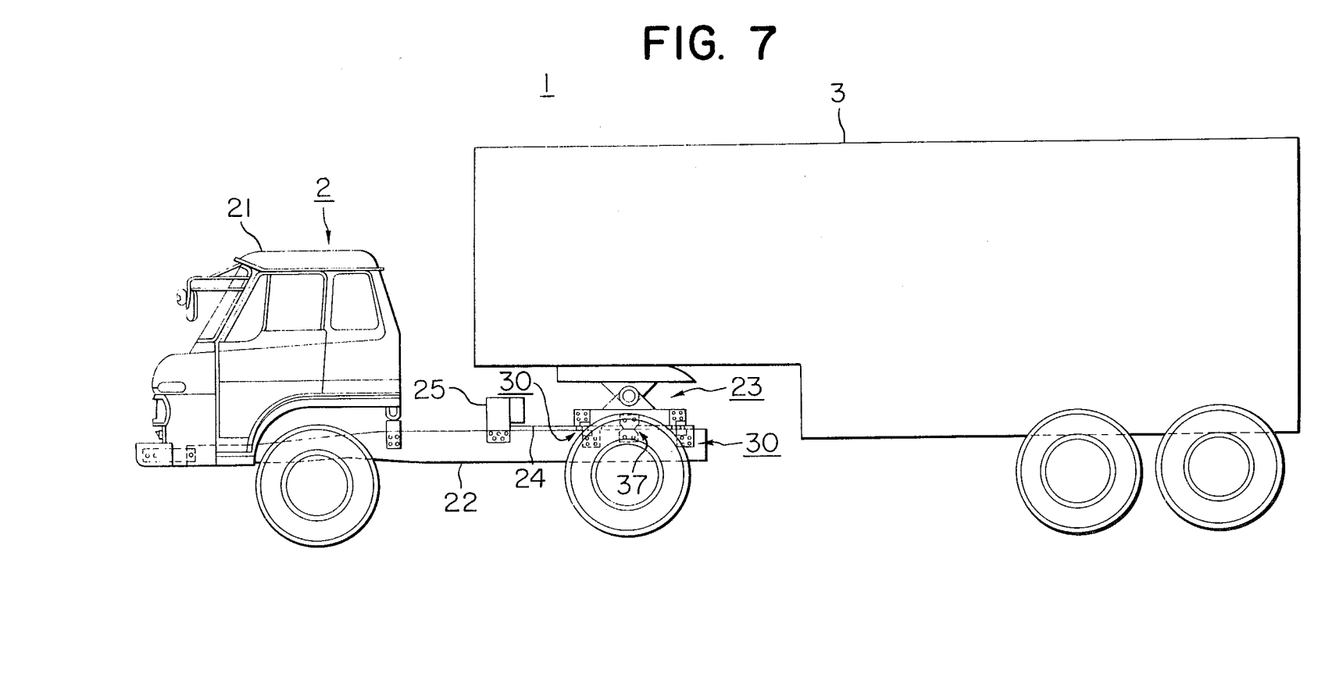
FIG. 7 shows a side view of a third embodiment of the trailer truck.
Figure 8:
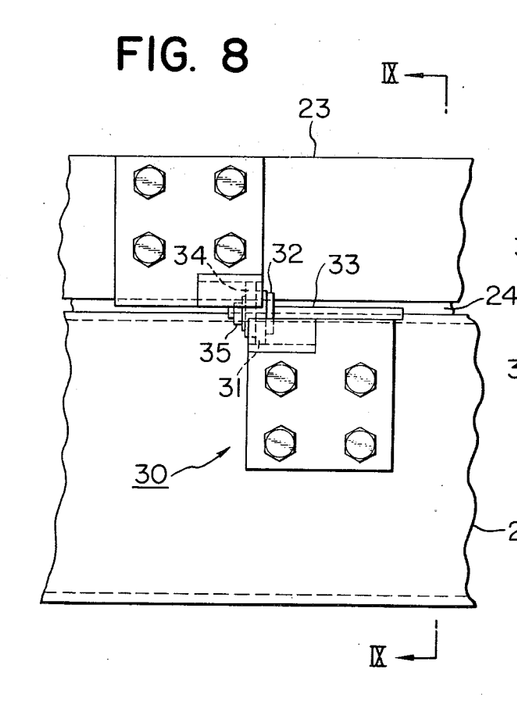
FIG. 8 shows an enlarged side view of an energy absorbing means used for the trailer truck in FIG. 7.
Figure 9:
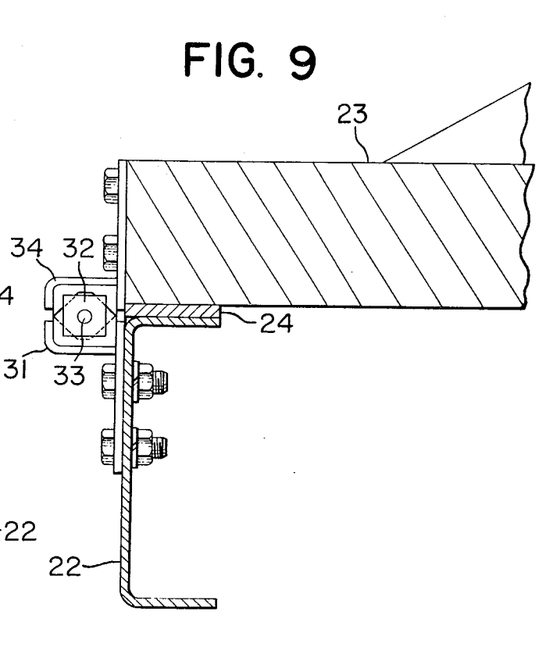
FIG. 9 shows a cross-sectional view taking along the line IX—IX in FIG. 8.

In the second embodiment shown in FIG. 6, the semitrailer truck 1 of the first embodiment is applied to a full trailer truck 4. A trailer 5 of the full trailer truck 4 includes a dolly 51. A coupler 53 is fixed on a chassis frame 52 of the dolly 51 through a friction plate 54 and bolts, not shown, similarly to the case described in FIGS. 1 to 5. Therefore, when a vehicle collides against the trailer 5 the coupler 53 is moved forwardly with the trailer 5 on the frame 52 by an impact force generated upon the collision to absorb kinetic energy of the trailer 5.

In the third embodiment shown in FIGS. 7 to 10, a tractor 2 includes a coupler 23 which is mounted on a chassis frame thereof through a friction plate 24. The frame 22 and the coupler 23 are fixed to each other by an energy absorbing means 30 and shear plates 37 or shear bolts, not shown, which are sheared by an impact force more than a predetermined value. The energy absorbing means 30 comprises a die 32 which is supported by a bracket 31 fixed to the frame 22 by bolts and a metal rod 33, the forward end of which has a smaller diameter portion fitted into and extending through a central bore in the die 32. The forward end of the rod 33 extends through a bracket 34 fixedly bolted to the coupler 23 and is secured against the forward surface thereof by a nut 35.

When the coupler 23 moves forwardly with the semitrailer 3 relative to the frame 22 by the impact force greater than a predetermined value upon collision, the metal rod 33 is extracted from the die 32 to cause plastic deformation of a larger diameter portion of the rod extending rearwardly from the die 32. Therefore, the kinetic energy of the semitrailer 3 which occupies most of whole kinetic energy of the semitrailer truck 1 is absorbed through the friction force of the friction plate 24 and the plastic deformation of the energy absorbing means 30.

Figures 10, 11:
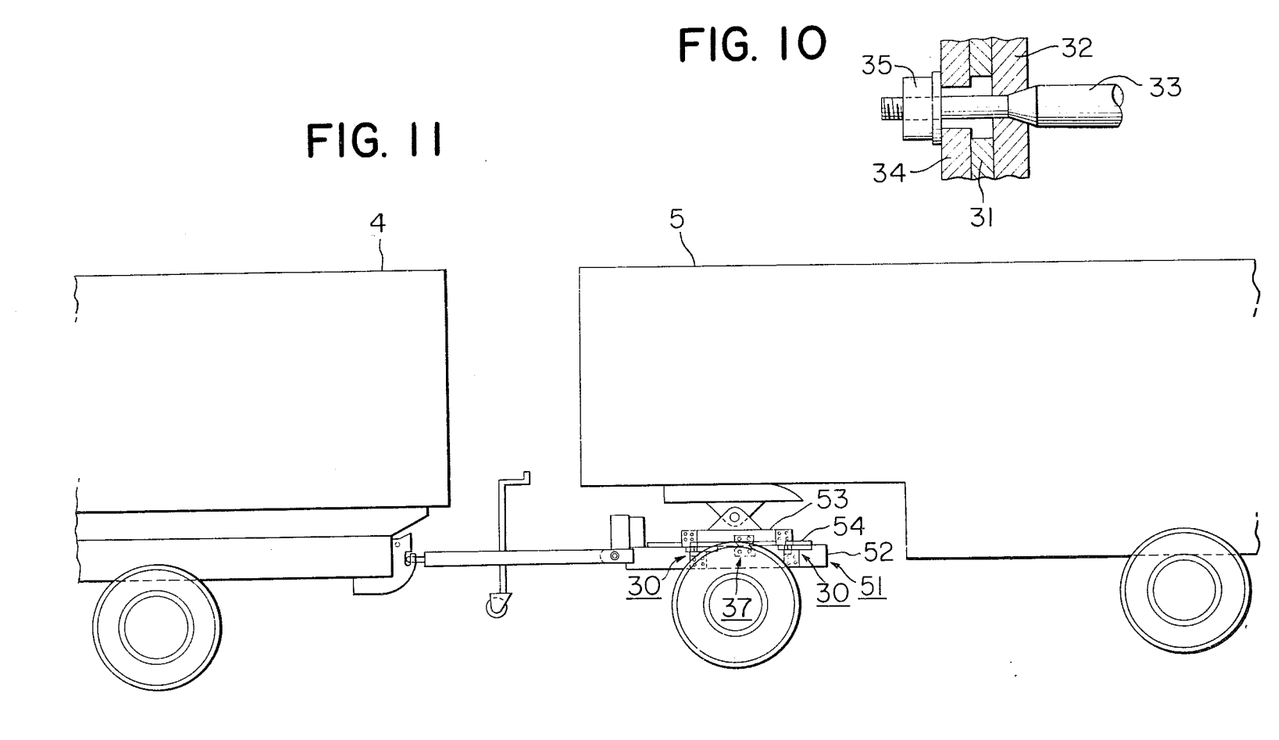
FIG. 10 shows an enlarged cross-section of a part in FIG. 8.
FIG. 11 shows a side view of a fourth embodiment of the trailer truck.

In the fourth embodiment shown in FIG. 11, the semitrailer truck 1 of the third embodiment is applied to a full trailer truck. A trailer 5 of the full trailer truck 4 includes a dolly 51. A coupler 53 is fixed on a frame 52 of the dolly 51 through a friction plate 54 and the energy absorbing means 30, similarly to the case described in FIGS. 7 to 10.

Figure 12:
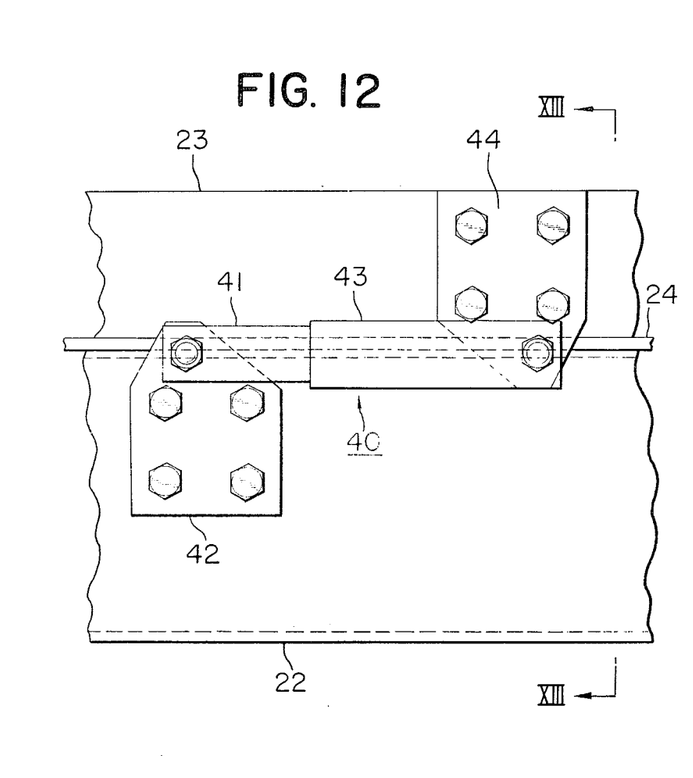
FIG. 12 shows a modified view of the energy absorbing means in FIG. 8.
Figure 13:
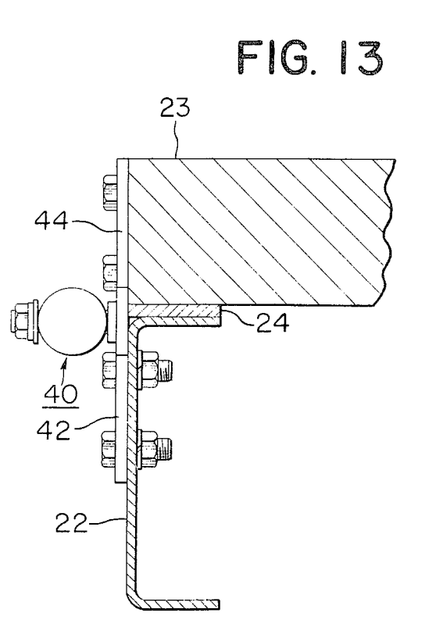
FIG. 13 shows a cross-sectional view taking along the line XIII—XIII in FIG. 12.

An energy absorbing means 40 shown in FIGS. 12 and 13 can be used as a substitute for the energy absorbing means 30 in the third and fourth embodiments in FIGS. 7 to 11. The energy absorbing means 40 consists of a damper cylinder which includes a piston portion 41 fixed at its forward end by means of a bolt to a bracket 42 bolted to the chassis frame 22 or 52 and a cylinder portion 43 fixed at its rear end by means of a bolt to a bracket 44 bolted to the coupler 23 or 53 and contained in its interior air or oil. There is provided a friction plate 24 or 54 between the frame 22 or 52 and the coupler 23 or 53.

Thus, the kinetic energy of the trailer upon collision is absorbed through a compression of air or oil in the damper cylinder when the coupler 23 or 53 moves forwardly with the trailer relative to the frame 22 or 52.

In the fifth embodiment shown in FIGS. 14 to 18, instead of using the energy absorbing means adapted to absorb the kinetic energy of the trailer through the forward movement of the trailer relative to the tractor upon collision, there is provided between the trailer and the tractor an energy transforming means 60 adapted to absorb the kinetic energy of the trailer through an upward movement of forward end of the trailer relative to the chassis frame 22 of the tractor 2 or the frame 52 of the dolly 51 upon collision.

Figure 14:
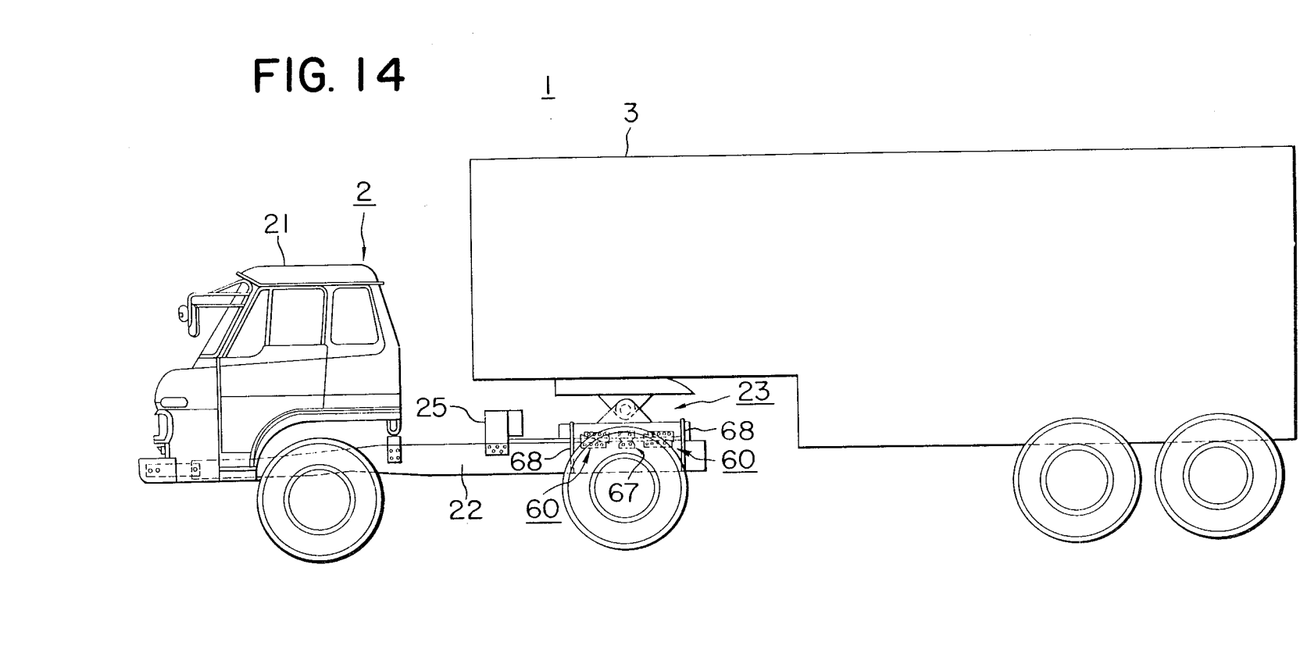
FIG. 14 shows a fifth embodiment of the trailer truck.
Figure 15:
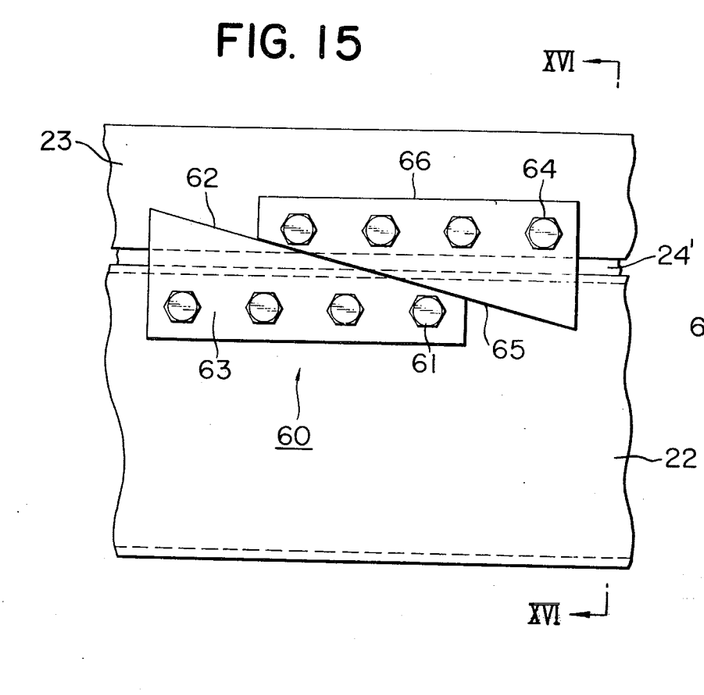
FIG. 15 shows a side view of an energy transforming means used for the trailer truck in FIG. 14.
Figure 16:
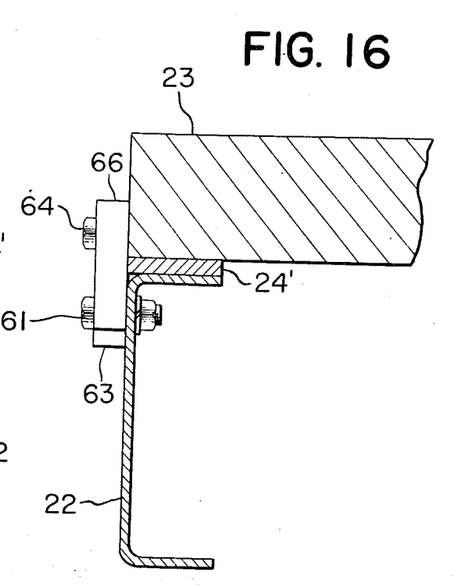
FIG. 16 shows a cross-sectional view taking along the line XVI—XVI in FIG. 15.

The energy transforming means 60 consists of a plate 63 fixed to the frame 22 by means of bolts 61 and having a linear sliding surface 62 inclined forwardly and upwardly and a plate 66 fixed to a bed of the coupler 23 by means of bolts 64 and having a sliding surface 65 in contact with the surface 62. The frame 22 and the coupler 23 are also fixed to each other near the center of the side of the coupler by means of shear plates 67 or shear pins, not shown, which are sheared by an impact force greater than a predetermined value, and secured vertically by means of U-bolts 68 at the front and rear ends of the coupler.

Figure 17:
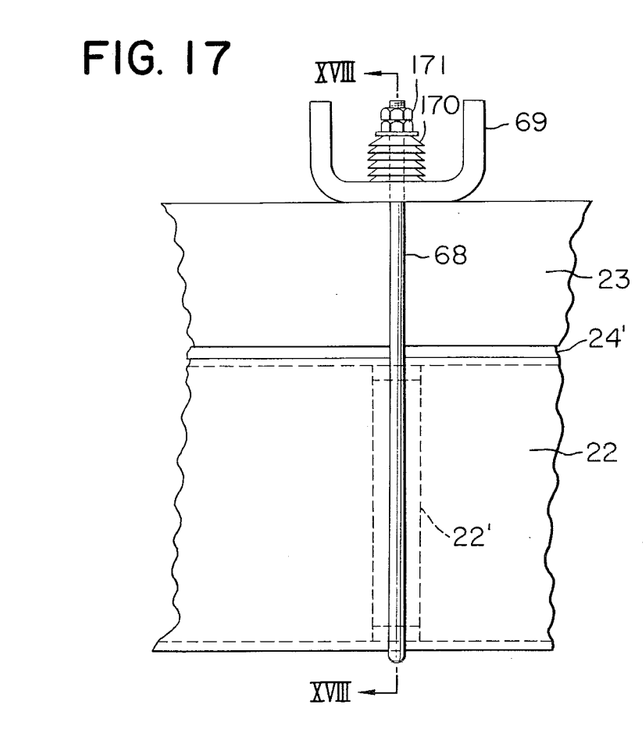
FIG. 17 shows an enlarged side view of a U-bolt used for the trailer truck in FIG. 14.
Figure 18:
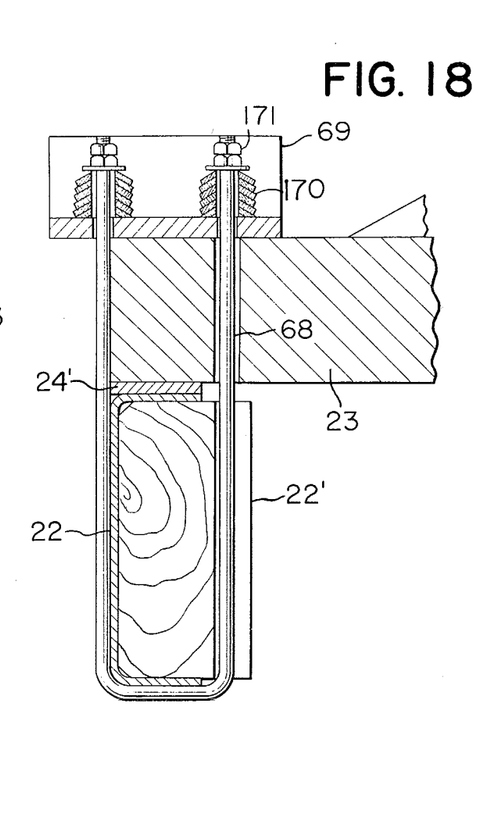
FIG. 18 shows a cross-sectional view taking along the line XVIII—XVIII in FIG. 17.

As seen from FIGS. 17 and 18, the U-bolt 68 holds the frame 22, a reinforcing member 22', a cushion 24' and the bed of the coupler 23 and the upper end of the U-bolt passing through a washer plate 69 is tightened by a nut 171 through belleville springs 170. The belleville springs 170 are provided for relieving an initial impact force.

A stopper 25 is fixed on the frame 22 in front of the coupler 23 to limit sliding movement of the semitrailer 3 with the coupler 23 when the semitrailer slides forwardly on the frame 22 by an abnormal impact force.

When a vehicle collides against the rear of the semitrailer 3 and an impact force acting forwardly thereonto exceeds a predetermined value, the shear plates 67 securing the coupler 23 and the frame 22 are sheared and coupler 23 mainly moves upwardly relative to the frame 22. That is, the coupler 23 which receives concentrically most of the kinetic energy of the semitrailer 3 is moved upwardly relative to the chassis frame 22 along the forwardly and upwardly inclined sliding surfaces 62 and 65 of the energy transforming means 60. By the reaction of the upward movement of the coupler 23 the frame 22 is strongly depressed down, also the wheels 5 are urged downwardly through suspensions so that the trailer truck is sufficiently braked without locking and effectively prevented from its forward movement upon braking operation. Therefore, the kinetic energy of the semitrailer 3 in the forward direction is absorbed through the transformation into potential energy and through plastic deformation of the U-bolts 68 caused by vertical stretch of the U-bolts.

Thus, in the conventional trailer trucks whole kinetic energy of the trailer acts forwardly onto the chassis frame of the tractor, but in the trailer truck according to the invention the kinetic energy is absorbed as described above so that the impact force affecting the crew in the cab through the chassis frame is reduced.

The operation of the above embodiment will be described when a vehicle collides against the semitrailer truck 1 from behind, but the same effect is obtained when the latter collides with obstacles.

Figure 19:
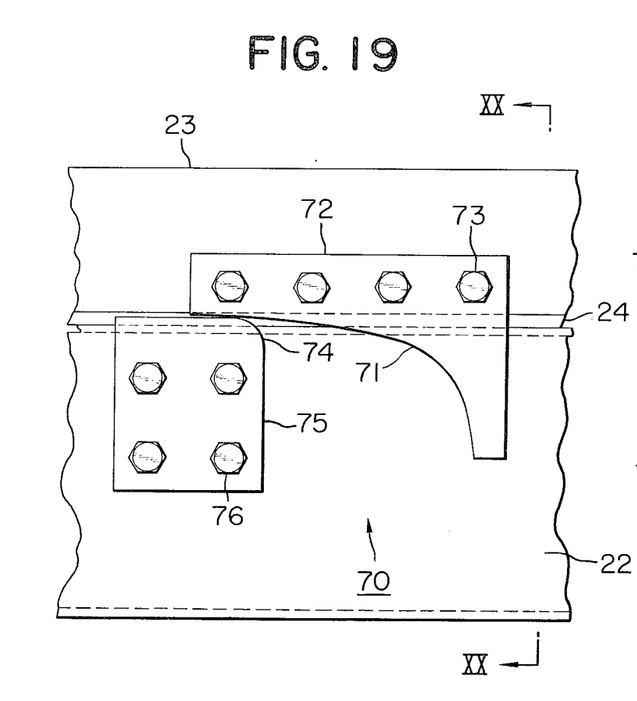
FIG. 19 shows a first modified view of the energy transforming means in FIG. 15.
Figure 20:
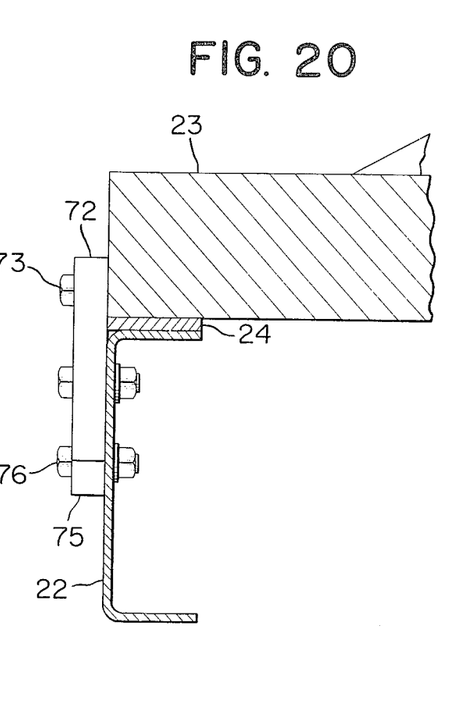
FIG. 20 shows a cross-sectional view taking along the line XX—XX in FIG. 19.

In the first modification of the energy transforming means 60, as shown in FIGS. 19 and 20, instead of the plates 63 and 66 of the energy transforming means 60 in the fifth embodiment with the linear inclined sliding surfaces, an energy transforming means 70 comprises a plate 72 having a sliding surface 71 of forwardly upward paraboloid and fixed at its upper portion to the bed of the coupler 23 by means of bolts 73 and a plate 75 fixed to the chassis frame 22 by means of bolts 76 and having a sliding surface 74 which is formed from a convex surface having a relatively small curvature and contacts with the sliding surface 71. A friction plate 24 is located between the frame 22 and the coupler 23 instead of the cushion 24' in the fifth embodiment. When a strong impact force is applied to the semitrailer 3 by the collision, initially a substantially horizontal portion of the sliding surface 71 of the plate 72 slides on the plate 75 so that the coupler 23 slides mainly forwardly relative to the frame 22 causing a slight upward movement. The friction plate 24 exhibits sufficiently its function to absorb the kinetic energy of the semitrailer 3. Upon forward displacement of the coupler 23 relative to the frame 22 at the rising portion of the sliding surface 71, the coupler 23 moves upwardly to absorb sufficiently said kinetic energy. In this case, the frame 22 and the coupler 23 are tightened as in the fifth embodiment by the U-bolts 68 which are plastically deformed upon receiving the vertical tensile force greater than a predetermined value.

Figure 21:
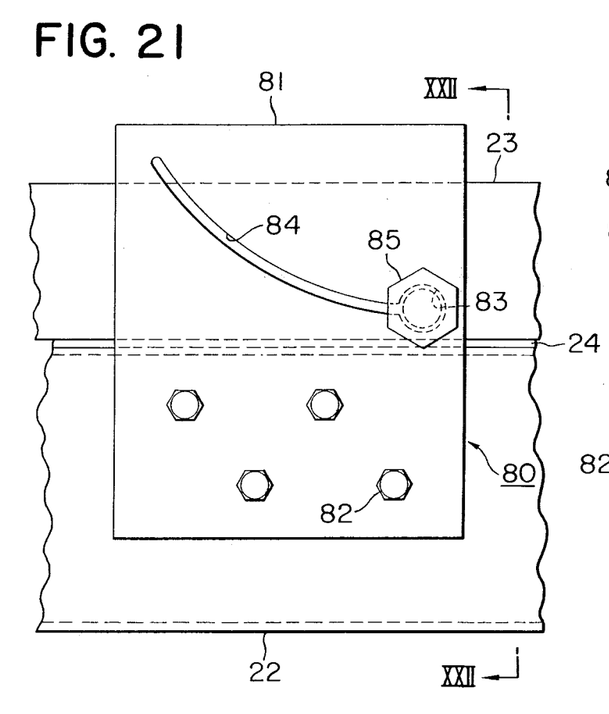
FIG. 21 shows a second modified view of the energy transforming means in FIG. 15.
Figure 22:
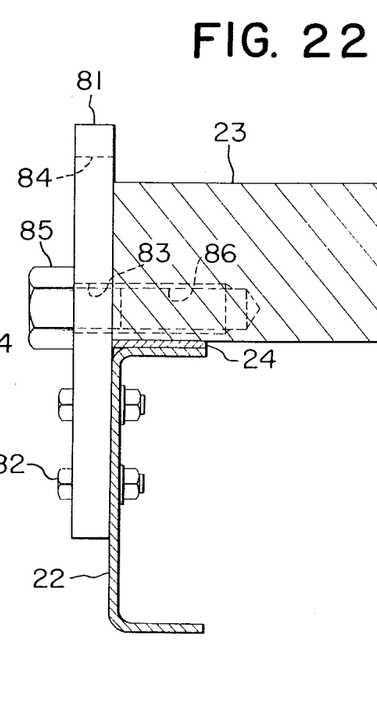
FIG. 22 shows a cross-sectional view taking along the line XXII—XXII in FIG. 21.

In the second modification of the energy transforming means 60, as shown in FIGS. 21 and 22, an energy tranforming means 80 comprises a plate 81 which is fixed at its lower portion to the chassis frame 22 by means of bolts 82. The upper portion of the plate 81 is provided at right hand side in FIG. 21 with a bore 83 and a slot 84 which is curved forwardly and upwardly therefrom and has a width much narrower than the diameter of the bore 83. A bolt 85 is inserted through the bore 83 into a threaded bore 86 in the coupler 23 to tighten the coupler and the plate 81. When the strong impact force in the direction of movement of the semitrailer truck 1 is applied to the semitrailer 3, the bolt 85 moves upwardly along the slot 84 to spread out the slot, thereby causing plastic deformation thereof. Simultaneously, the coupler 23 and the front of the semitrailer 3 are displaced upwardly by the movement of the bolt 85. Thus, the forward kinetic energy of the semitrailer 3 is absorbed through the plastic deformation of the slot 84 and the transformation into potential energy at the coupler 23 and the front of the semitrailer 3.

It may be arranged that the plate 81 includes a lower portion having the bore 83 and the slot 84 and the upper portion fixed to the coupler 23 by the bolts 82 while the bolt 85 is inserted through the bore 83 in the lower portion of the plate into the threaded bore, not shown, to tighten the plate and the frame, thereby achieving the same operational effect as the above.

While several complete embodiments of the invention have been disclosed herein, it will be appreciated that modification of these particular embodiments of the invention may be resorted to without departing from the scope of the invention.

What is claimed is:

1. A trailer truck comprising a trailer mounted at its front on the rear of a chassis frame of a tractor to be allowed to move forwardly or upwardly relative to said frame upon application of a longitudinal impact force greater than a predetermined value to said trailer, and an energy absorbing system located between said chassis frame and said front of the trailer for absorbing kinetic energy of said trailer upon said relative movement thereof, said energy absorbing system being located between said chassis frame of the tractor and a bed of a coupler connected at its upper end to the bottom of said front of the trailer, said energy absorbing system comprises a flat load carrying friction plate positioned between said chassis frame of the tractor and said bed of the coupler, and shearable means connecting said chassis frame to said coupler bed.

2. A trailer truck according to claim 1, wherein said energy absorbing system comprises a friction plate positioned between said frame of the tractor and said bed of the coupler.

3. A trailer truck according to claim 2, wherein said energy absorbing system comprises a metal fixing plate fixed at its lower portion to said frame and provided at its upper portion with a bore for tightening the plate with said bed of the coupler and with a slot extending forwardly and downwardly from said bore and having a width narrower than a diameter of the bore, and a bolt inserted through said bore.

4. A trailer truck according to claim 2, wherein said energy absorbing system is provided at a bolt connection between said frame and said bed of the coupler and comprises a bore for allowing passage of the bolt provided in either of said frame or said bed of the coupler and a slot extending forwardly of said frame from said bore and having a width narrower than a diameter thereof, said bolt being adapted to spread out said slot to cause plastic deformation thereof when said coupler moves forwardly relative to said frame.

5. A trailer truck according to claim 2, wherein said energy absorbing system comprises a damper cylinder ends of which are fixed to said frame and said bed of the coupler respectively.

6. A trailer truck according to claim 2, wherein said energy absorbing system comprises an energy transforming means for allowing an upward movement of said bed of the coupler relative to said frame by said longitudinal impact force, thereby absorbing the kinetic energy of said trailer.

7. A trailer truck according to claim 6, wherein said energy transforming means comprises a first member fixed to either of said bed of the coupler or said frame and formed with a linear or curved sliding surface inclined forwardly and upwardly and a second member fixed to said frame or said bed of the coupler and formed with a sliding surface contacting with said sliding surface of said first member.

8. A trailer truck according to claim 6, wherein said energy transforming means comprises a first plate-like member fixed to either of said bed of the coupler or said frame and formed with a linear or curved elongate slot inclined forwardly and upwardly and with a bore at an end of said slot, a diameter of said bore being greater than the width of said slot, and a cylindrical member fixed to said frame or said bed of the coupler and passing through said bore in the first member.

9. A trailer truck according to claim 6, wherein said energy absorbing system further comprises an energy absorbing member located between said bed of the coupler and said frame and plastically deformable to absorb the kinetic energy of said trailer when said bed of the coupler is moved upwardly relative to said frame.

10. A trailer truck according to claim 9, wherein said energy absorbing member is cylindrical, said kinetic energy of said trailer being absorbed by a stretching deformation of said energy absorbing member.

11. A trailer truck according to claim 10, wherein resilient means is located between said energy absorbing member and said bed and frame and resiliently deformable in the axial direction of said energy absorbing member.

12. A trailer truck comprising a trailer mounted at its front on the rear of a chassis frame of a tractor to be allowed to move forwardly or upwardly relative to said frame upon application of a longitudinal impact force greater than a predetermined value to said trailer, and an energy absorbing system located between said chassis frame and said front of the trailer for absorbing kinetic energy of said trailer upon said relative movement thereof, said energy absorbing system being located between said chassis frame of the tractor and the bed of a coupler which is connected at its upper end to the bottom of said front of the trailer, said energy absorbing system comprising a friction plate positioned between said chassis frame of the tractor and said bed of the coupler, and said energy absorbing system also comprising a die fixed to either of said chassis frame or said bed of the coupler, and a metal rod fixed at its forward end to the other of said bed or said frame and having a smaller diameter portion on its forward end extending through the bore in said die with its larger diameter portion extending rearwardly therefrom to cause plastic deformation of said larger diameter portion upon forward movement of said bed relative to said frame.

13. A trailer truck according to claim 12 wherein said energy absorbing system connects a trailer to a full trailer truck, the full trailer truck including a dolly having a frame forming said chassis frame.

14. A trailer truck comprising a trailer mounted at its front on the rear of a chassis frame of a tractor to be allowed to move forwardly or upwardly relative to said frame upon application of a longitudinal impact force greater than a predetermined value to said trailer, and an energy absorbing system located between said chassis frame and said front of the trailer for absorbing kinetic energy of said trailer upon said relative movement thereof, said energy absorbing system being located between said chassis frame of the tractor and the bed of a coupler which is connected at its upper end to the bottom of said front of the trailer, said energy absorbing system comprising a friction plate positioned between said chassis frame of the tractor and said bed of the coupler, and said chassis frame is a frame member and said bed is a support for the coupler and comprises a bed member, said energy absorbing system including an apertured die fixed to one of said members, and an axially extending metal rod having a smaller diameter forward portion positioned in and extending through the bore in said die and secured at its forward end to the other of said members with its larger diameter portion extending rearwardly of said trailer from said die for plastic deformation of said larger diameter portion as it is pulled through said die on forward movement of said trailer relative to said frame member.

15. A trailer truck according to claim 14 wherein said energy absorbing system connects a trailer to a full trailer truck, the full trailer truck including a dolly having a frame forming said chassis frame.

* * * * *